United States Patent
Oh et al.

(10) Patent No.: US 7,229,707 B2
(45) Date of Patent: Jun. 12, 2007

(54) MAGNETIC RECORDING MEDIUM

(75) Inventors: Hoon-sang Oh, Seoul (KR);
Byung-kyu Lee, Seoul (KR)

(73) Assignee: Samsung Electronics Co., Ltd., Suwon, Kyungki-do (KR)

( * ) Notice: Subject to any disclaimer, the term of this patent is extended or adjusted under 35 U.S.C. 154(b) by 0 days.

(21) Appl. No.: 10/444,962

(22) Filed: May 27, 2003

(65) Prior Publication Data
US 2004/0072031 A1    Apr. 15, 2004

(30) Foreign Application Priority Data
Oct. 1, 2002    (KR) ............... 10-2002-0059780

(51) Int. Cl.
*G11B 5/66* (2006.01)
(52) U.S. Cl. ................................ 428/831
(58) Field of Classification Search .......... 428/694 TS, 428/694 TM, 611, 900, 336, 667, 828, 831, 428/826
See application file for complete search history.

(56) References Cited

U.S. PATENT DOCUMENTS

| | | | |
|---|---|---|---|
| 5,731,070 A | | 3/1998 | Endo et al. |
| 6,475,611 B1 * | | 11/2002 | Chen .......................... 428/213 |
| 6,602,621 B2 * | | 8/2003 | Matsunuma et al. ... 428/694 TS |

FOREIGN PATENT DOCUMENTS

| | | |
|---|---|---|
| JP | 7169042 | 4/1995 |
| JP | 08-030951 | 2/1996 |
| JP | 2000-276727 | 10/2000 |
| JP | 2001-283428 | 10/2001 |
| JP | 2002-197636 | 7/2002 |
| KR | 1989-0005661 | 5/1989 |

OTHER PUBLICATIONS

Saito et al., "Magnetic properties and microstructure of CoCrPtB perpendicular thin-film media with a Co60Cr40 layer and a very thin C layer", Jan. 2002, Acad. J. Soc. Appl. Magn., vol. 26, No. 4, pp. 210-214.*
Machine translation of JP 2001-283428, Oikawa Soichi et al., Oct. 2001.*
Machine translation of JP 08-030951, Yoshino Ryoetsu et al., Feb. 1996.*
Machine translation of JP 2000-276727, Shimizu, Kenji et al., Oct. 2000.*
Machine translation of JP 2002-197636, Aisaka Tetsuya, Jul. 2002.*
Notice to Submit Response issued by the Korean Patent Office on May 17, 2004 in corresponding application 10-2002-0059780.
Japanese Office Action dated Apr. 12, 2006.

* cited by examiner

Primary Examiner—Holly Rickman
(74) Attorney, Agent, or Firm—Buchanan Ingersoll & Rooney PC

(57) ABSTRACT

A magnetic recording medium including a magnetic recording layer and a substrate that supports the magnetic recording layer is provided. At least two underlayers including a nonmetallic underlayer are placed between the magnetic recording layer and the substrate. The perpendicular magnetic recording medium uses a double-layered or tri-layered underlayer. Accordingly, a perpendicular magnetic recording layer can have a high perpendicular magnetic anisotropic energy constant Ku due to a third underlayer and have small crystal grains and a small exchange coupling due to a second underlayer below the third underlayer. Thus, the perpendicular magnetic recording layer can have a good thermal stability, high-density recording characteristics, and excellent SNR characteristics.

20 Claims, 7 Drawing Sheets

CoCrPtX/Pt/Ti

CoCrPtX/Pt/C/Ti

MAGNETIC RECORDING MEDIUM

BACKGROUND OF THE INVENTION

This application claims the priority of Korean Patent Application No. 2002-59780, filed on Oct. 1, 2002, in the Korean Intellectual Property Office, the disclosure of which is incorporated herein in its entirety by reference.

1. Field of the Invention

The present invention relates to a magnetic recording medium capable of recording data with a high density, and more particularly, to a magnetic recording medium having a magnetic recording layer which has a high thermal stability, high-density recording characteristics, and excellent SNR characteristics.

2. Description of the Related Art

Hard disk drives (HDDs), which are representative magnetic data storage devices and lead a rapid increase of the recording density, are currently adopting a longitudinal magnetic recording method where a ring-type head and longitudinal magnetic recording media are involved. A conventional longitudinal magnetic recording method, however, comes across a limit in increasing the recording density because of the thermal instability of a recording medium, and a new recording method, which is a perpendicular magnetic recording method, is currently being actively developed since the perpendicular magnetic recording method is expected to increase the recording density further well beyond 200 Gb/in$^2$.

In contrast with an existing longitudinal magnetic recording method, in the perpendicular magnetic recording method, bits recorded on a recording medium are magnetized in a direction perpendicular to a substrate. The recording density can be further improved by using perpendicular magnetic recording media having the following characteristics: 1) a high perpendicular magnetic anisotropic energy constant Ku (>1×10$^6$ erg/cc) and a high coercive force; 2) small crystal grains; and 3) a low exchange coupling between magnetic particles.

General magnetic media having a single magnetic layer each include a recording layer and an underlayer. The recording layer stores magnetic information. The underlayer is formed on a substrate before the recording layer is formed, and improves the magnetic/crystal characteristics of the recording layer. General magnetic media having a double magnetic layer each further include a soft magnetic underlayer in addition to the recording layer and the underlayer so as to increase the intensity and spatial change rate of a magnetic field formed by a pole type recording head including an induction coil upon magnetic recording.

Figure 1:
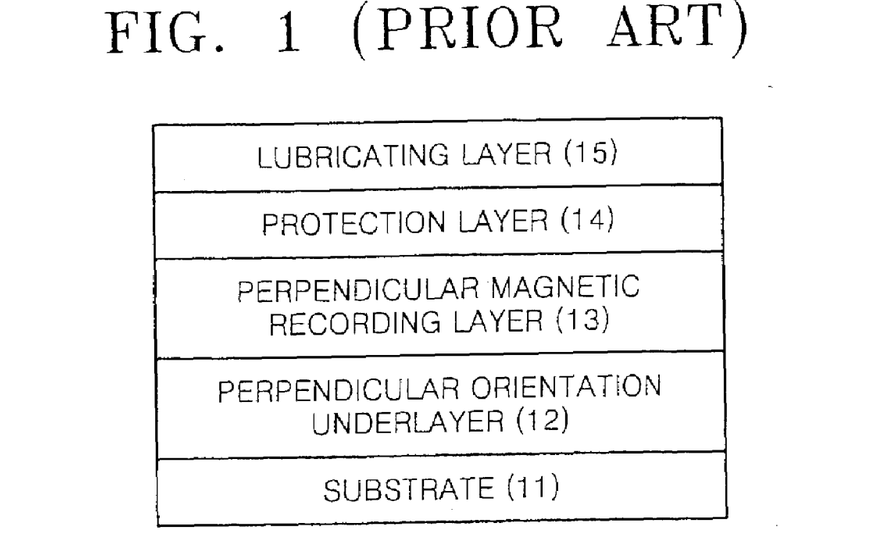
FIG. 1 shows the layer structure of a conventional perpendicular magnetic recording medium having a single magnetic layer.
Figure 2:
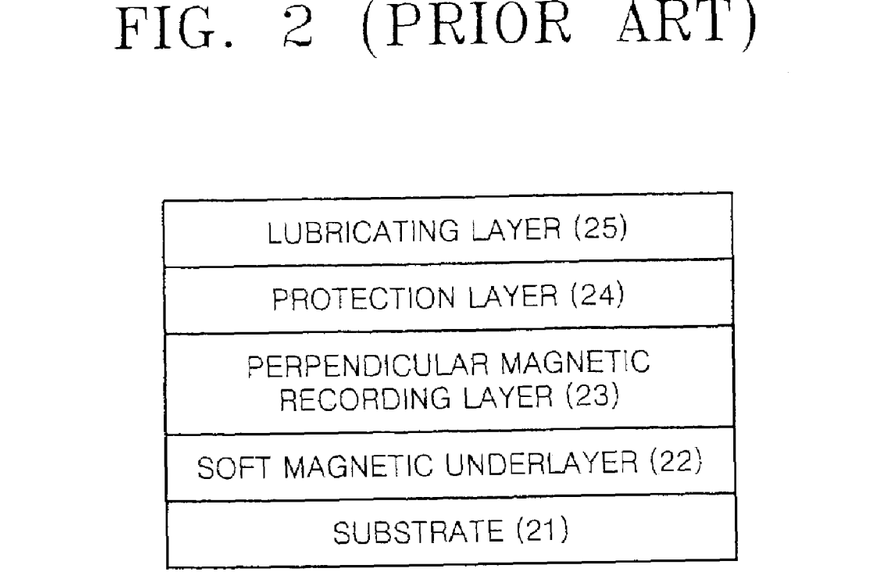
FIG. 2 shows the layer structure of a conventional perpendicular magnetic recording medium having two magnetic layers.
Figure 3:
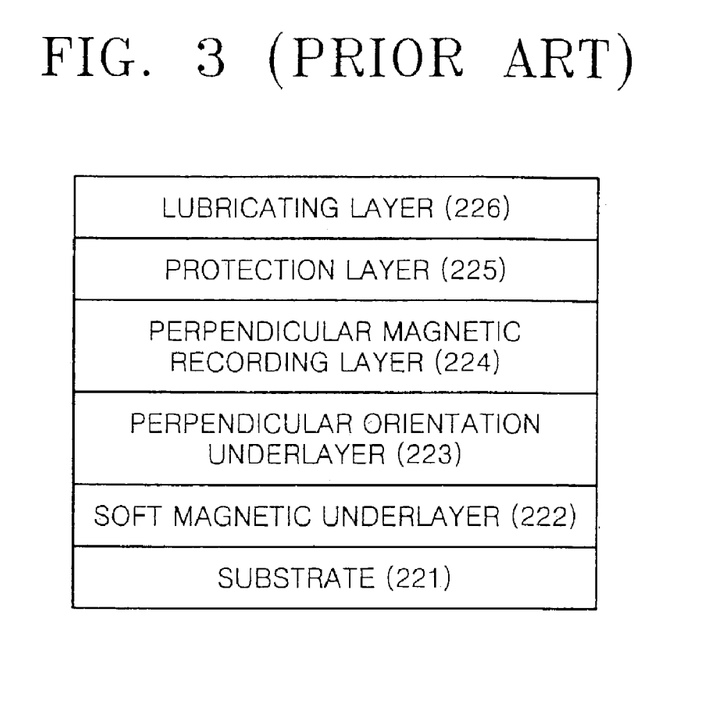
FIG. 3 shows the layer structure of another conventional perpendicular magnetic recording medium having two magnetic layers.

As shown in FIGS. 1 through 3, in conventional perpendicular magnetic recording media, perpendicular orientation underlayers 12 and 223 are placed below perpendicular magnetic recording layers 13 and 224, respectively, and a soft magnetic underlayer 22 is placed below a perpendicular magnetic recording layer 23. FIG. 1 shows a perpendicular magnetic recording medium having a single magnetic layer, and FIGS. 2 and 3 show perpendicular magnetic recording media each having double magnetic layers.

Referring to FIGS. 1 and 2, the perpendicular orientation underlayer 12 and the soft magnetic underlayer 22 are placed on substrates 11 and 21, respectively. The perpendicular magnetic recording layers 13 and 23 are formed on the perpendicular orientation underlayer 12 and the soft magnetic underlayer 22, respectively. Protection layers 14 and 24 are placed on the perpendicular magnetic recording layers 13 and 23, respectively. Lubricating layers 15 and 25 are formed on the protection layers 14 and 24, respectively, to protect the protection layers 14 and 24 and the perpendicular magnetic recording layers 13 and 23 against collisions with a data writing/reading head slider and induce smooth sliding of the data writing/reading head slider.

Compared to the perpendicular magnetic recording medium of FIG. 2, the conventional perpendicular magnetic recording medium of FIG. 3 further includes the perpendicular orientation underlayer 223 between the perpendicular magnetic recording layer 224 and the soft magnetic underlayer 222.

It is known that magnetic properties of a CoCrPtX-based (X=B, Nb, Ta, or O) alloy thin film, which is widely used to form a perpendicular magnetic recording layer 13, 23, or 224, are greatly affected by the type and structure of an underlayer.

Ti, which has been widely used to form a perpendicular orientation underlayer, is known to form a thick initial growth layer due to a relatively large difference in a crystal lattice constant between Ti and a CoCrPtX-based alloy thin film for a perpendicular magnetic recording layer, thereby degrading the orientation characteristics of the perpendicular magnetic recording layer.

Pt, which can be used to form a perpendicular orientation underlayer, makes a perpendicular magnetic recording layer have excellent perpendicular orientation characteristics because of a small difference in the lattice constant between Pt and a CoCrPtX-based alloy for a perpendicular magnetic recording layer. However, Pt increases the sizes of the crystal grains of the perpendicular magnetic recording layer made of a CoCrPtX-based alloy (particularly, a CoCrPtX-based alloy containing 10 or higher atomic percent of Pt) and also significantly increases an exchange coupling between magnetic particles, thereby reducing the signal to noise ratio (SNR) upon data writing/reading. A degree to which the use of the Pt underlayer increases the size of the crystal grains of the recording layer and the exchange coupling between magnetic particles is closely related to the thickness of the Pt underlayer. If a thick Pt underlayer is used, as described above, a high perpendicular magnetic anisotropy (Ku) and a high coercive force are obtained due to the excellent perpendicular crystal orientation of the recording layer. However, the enlargement of the crystal grains of the Pt underlayer increases the sizes of the crystal grains of the recording layer and the exchange coupling between magnetic particles. On the other hand, if a thin Pt underlayer is used, the sizes of the crystal grains of a perpendicular magnetic recording layer and the exchange coupling between magnetic particles do not increase much. However, the degree of the perpendicular orientation of the perpendicular magnetic recording layer decreases, thereby providing a low perpendicular magnetic anisotropy energy constant Ku and a low coercive force.

SUMMARY OF THE INVENTION

An object of the present invention is to obtain a higher magnetic recording density by proposing a method for improving the recording characteristics of a recording layer by controlling how an underlayer is deposited below the recording layer.

To achieve the above object of the present invention, there is provided a magnetic recording medium including a magnetic recording layer and a substrate that supports the magnetic recording layer. At least two underlayers including a nonmetallic underlayer are placed between the magnetic recording layer and the substrate.

The magnetic recording layer may be either a longitudinal magnetic recording layer or a perpendicular magnetic recording layer. Preferably, the magnetic recording layer is a perpendicular magnetic recording layer. A soft magnetic layer is formed between a stack of underlayers and the substrate.

According to an embodiment of the present invention, first, second, and third underlayers are included, and the first underlayer adjacent to the substrate is formed of a material selected from the group consisting of Ti, Pt, Ta, Pd, and Au or an alloy containing at least two materials selected from the group, the second underlayer is formed of a material selected from the group consisting of carbon, silicon, a silicon oxide, a silicon nitride, a metal oxide, a metal nitride, and a metal sulfide, and the third underlayer is formed of a material selected from the group consisting of Pt, Pd, Ru, a Pt alloy, a Pd alloy, a Ru alloy, and a Co alloy.

According to another embodiment of the present invention, two underlayers are included, and one underlayer adjacent to the substrate is formed of a material selected from the group consisting of carbon, silicon, a silicon oxide, a silicon nitride, a metal oxide, a metal nitride, and a metal sulfide, and the other underlayer adjacent to the magnetic recording layer is formed of a material selected from the group consisting of Pt, Pd, Ru, a Pt alloy, a Pd alloy, a Ru alloy, and a Co alloy.

In the magnetic recording medium, preferably, the total thickness of the underlayers is no more than 15 nm.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, magnetic recording media according to preferred embodiments of the present invention will be described in detail with reference to the attached drawings. In the following embodiments according to the present invention, magnetic recording media using a perpendicular magnetic recording method will be described. However, the present invention can also be applied to a longitudinal magnetic recording method. Hence, it can be understood that all recording methods are within the technical scope of the present invention.

Figure 4:
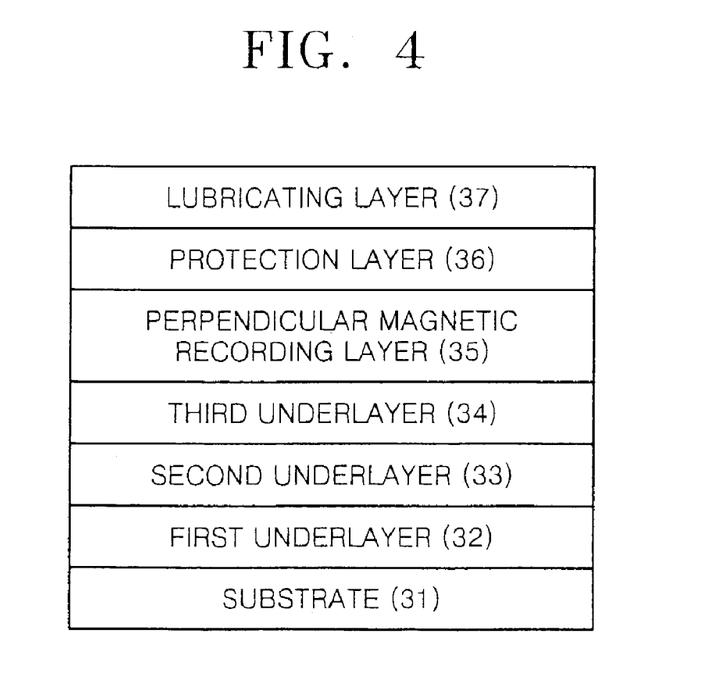
FIG. 4 shows the layer structure of a perpendicular magnetic recording medium having a perpendicular magnetic recording medium with a single magnetic layer according to an embodiment of the present invention, in which three underlayers are included.
Figure 5:
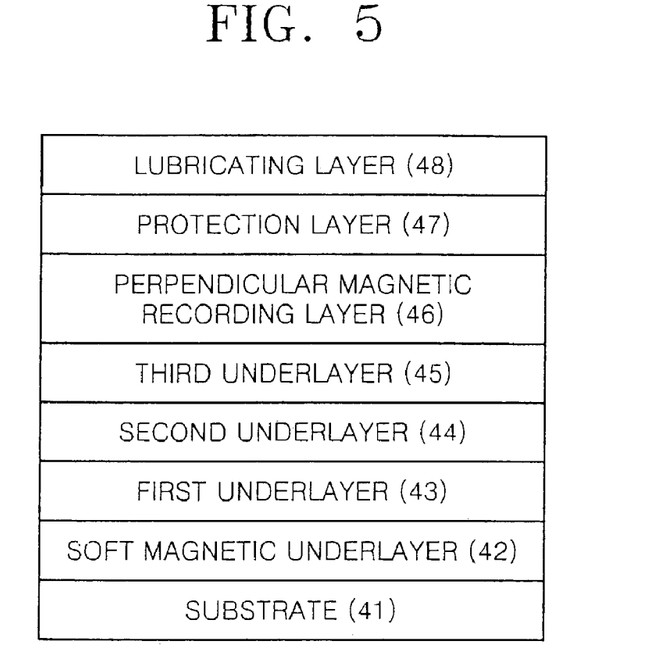
FIG. 5 shows the layer structure of a perpendicular magnetic recording medium with two magnetic layers according to an embodiment of the present invention, in which three underlayers are placed between a recording layer and a soft magnetic underlayer.
Figure 6:
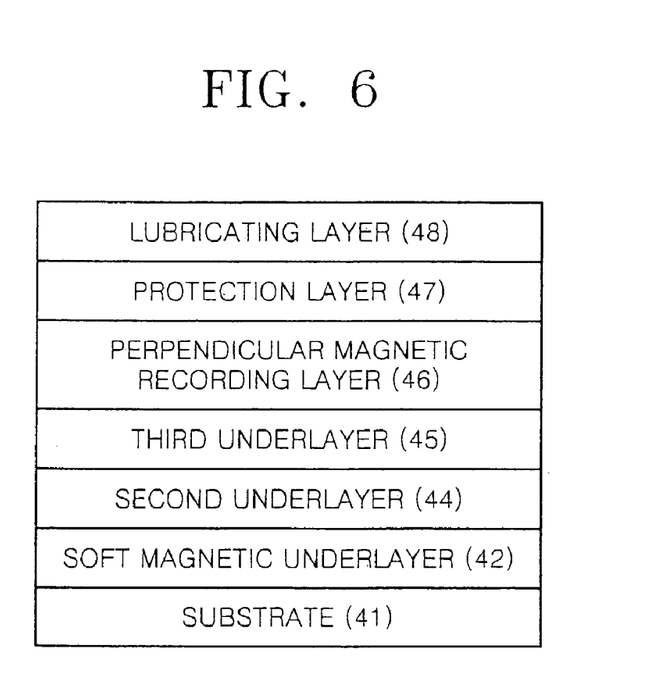
FIG. 6 shows the layer structure of a perpendicular magnetic recording medium with two magnetic layers according to another embodiment of the present invention, in which two underlayers are included.

Magnetic recording media with a single magnetic layer and magnetic recording media with two magnetic layers according to the present invention are shown in FIGS. 4 through 6. As shown in FIG. 4, in a perpendicular magnetic recording medium with a single magnetic layer, a first underlayer 32 made of metal, a second underlayer 33 made of non-metal, and a third underlayer 34 made of Pt or a Pt alloy are sequentially formed between a perpendicular magnetic recording layer 35 and a substrate 31.

As shown in FIG. 5, in a perpendicular magnetic recording medium with a double magnetic layer according to an embodiment of the present invention, first, second, and third underlayers 43, 44, and 45 are sequentially formed between a soft magnetic underlayer 42 and a perpendicular magnetic recording layer 46, as in the perpendicular magnetic recording medium with a single magnetic layer of FIG. 4. As shown in FIG. 6, in a perpendicular magnetic recording medium with a double magnetic layer according to another embodiment of the present invention, only the second and third underlayers 44 and 45 are sequentially formed between the soft magnetic underlayer 42 and the perpendicular magnetic recording layer 46.

In the perpendicular magnetic recording medium of FIG. 4, the first underlayer 32 is formed of a metal, such as, Ti, and serves as a planarization layer which covers the rough surface and heals the surface defects of the substrate 31 made of glass or an Al alloy to provide a flat surface on which a thin film to be deposited can be stably grown. In the perpendicular magnetic recording media with a double magnetic layer of FIGS. 5 and 6, the soft magnetic underlayer 42 is formed before the perpendicular magnetic recording layer 46 is deposited. In some cases, a process for forming the first underlayer may not be performed so as to obtain the structure of a perpendicular magnetic recording medium as shown in FIG. 6.

As shown in FIGS. 4 and 5, the second underlayer 33 is formed on the first underlayers 32 and 43 by depositing a thin nonmetallic material, such as, carbon, silicon, silicon/oxide/nitride, or metal oxide/nitride/sulfide. Similarly, as shown in FIG. 6, the second underlayer 44 is formed on the soft magnetic underlayers 42 by depositing a thin nonmetallic material, such as, carbon, silicon, silicon/oxide/nitride, or metal oxide/nitride/sulfide. The second underlayers 33 and 44 play core roles in reducing the size of the crystal grains of the third underlayers 34 and 35 to be formed of Pt or a Pt alloy on the second underlayers 33 and 44. The third underlayers 34 and 45 are formed on the second underlayers 33 and 44, respectively, by thinly depositing Pt, Pd, Ru, a Pt alloy, a Pd alloy, a Ru alloy, or a Co alloy. Thereafter, the perpendicular magnetic recording layers 35 and 46 are formed on the third underlayers 34 and 45, respectively. As described above, the non-metallic second underlayers 33 and 44 reduce the sizes of the crystal grains of the material for the third underlayers 34 and 45, for example, Pt, and accordingly reduce the sizes of the crystal rains of the perpendicular magnetic recording layers 35 and 46 grown on the third underlayers 34 and 45 and an exchange coupling between magnetic particles. The non-metallic second underlayers 33 and 44 also create many magnetic domain pinning sites which restrain the domain wall motion of perpendicular magnetic recording layers 35 and 46. Accordingly, as compared with the case where the second underlayers 33 and 44 are not formed, perpendicular magnetic recording layers 35 and 46 with a high coercive force can be formed even if third Pt underlayers 34 and 45 are somewhat thin.

To sum up, the perpendicular magnetic recording medium with a single magnetic layer of FIG. 4 uses a multi-layered structure in which a first underlayer is formed of metal such as Ti, a second underlayer is formed of non-metal such as carbon (C), and a third underlayer is formed of Pt or a Pt alloy.

To sum up the perpendicular magnetic recording media with two magnetic layers of FIGS. 5 and 6, the first, second, and third underlayers 43, 44, and 45 are consecutively deposited on the soft magnetic underlayer 42. The first underlayer 43 made of metal may not be formed as in FIG. 6.

Figure 7:
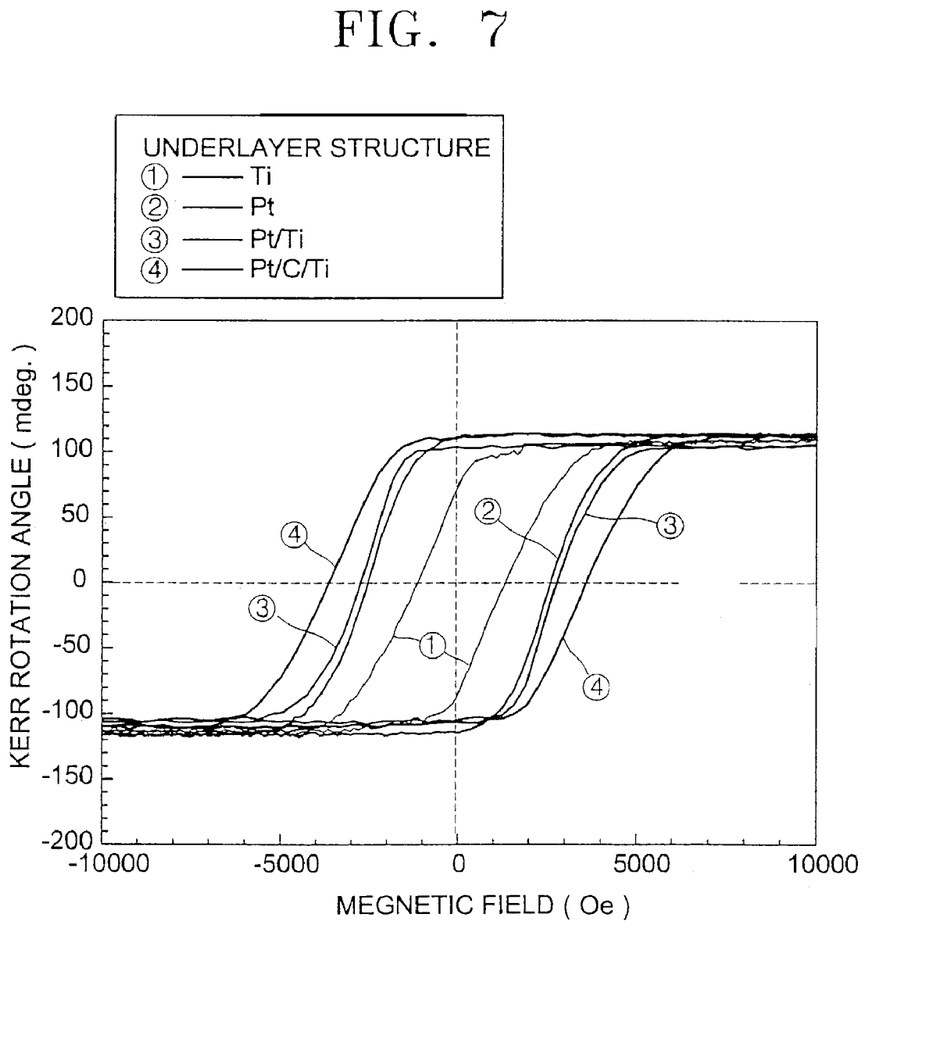
FIG. 7 shows the magnetic hysteresis curves of conventional perpendicular magnetic recording media having a single-layered underlayer and a double-layered underlayer and a perpendicular magnetic recording medium according to the present invention having a Pt/C/Ti tri-layered underlayer.

FIG. 7 shows the magnetic hysteresis curves of a perpendicular magnetic recording medium having a 3-layered Pt/C/Ti underlayer according to the present invention and conventional perpendicular magnetic recording media having a single Pt underlayer, a single Ti underlayer, and a double-layered Pt/Ti underlayer. As shown in FIG. 7, the conventional perpendicular magnetic recording medium using a single Ti underlayer has a greatly low coercive force and a greatly low squareness. In the conventional perpendicular magnetic recording medium using a single Pt underlayer, the coercive force is not low, and the exchange coupling between magnetic particles is high, which can be inferred from the fact that the slope of a magnetic hysteresis loop around coercive force is very large. Accordingly, the conventional perpendicular magnetic recording medium using a single Pt underlayer can be expected to produce large noise upon recording/reproduction. In the conventional perpendicular magnetic recording medium using a double-layered Pt/Ti underlayer, the coercive force is higher than that of the conventional magnetic recording medium using the single Pt underlayer. The perpendicular magnetic recording medium according to the present invention using a three-layered Pt/C/Ti underlayer has greatly superior magnetic characteristics, that is, a higher coercive force and a smaller slope of a magnetic hysteresis loop around coercive force than those of the conventional perpendicular magnetic recording medium using the double-layered Pt/Ti underlayer.

Figure 8:
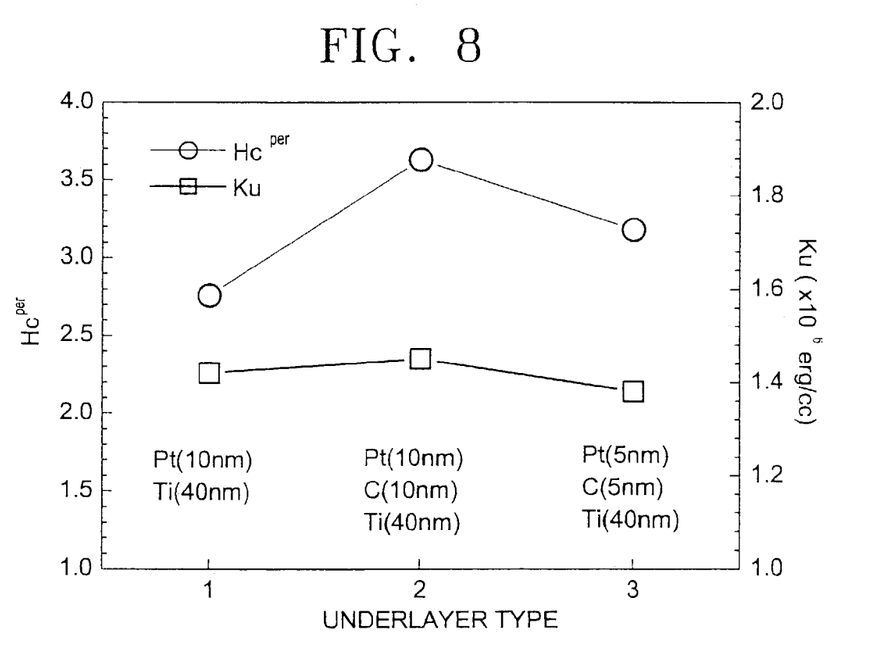
FIG. 8 is a graph showing the perpendicular coercive force $Hc^{per}$ and perpendicular magnetic anisotropic energy constant Ku of perpendicular magnetic recording media according to the present invention having three-layered Pt/C/Ti underlayers and a conventional perpendicular magnetic recording medium having a double-layered Pt/Ti underlayer.

FIG. 8 is a graph showing the perpendicular coercive force $Hc^{per}$ and perpendicular magnetic anisotropic energy constant Ku of perpendicular magnetic recording media according to the present invention having three-layered Pt/C/Ti underlayer structures and a conventional perpendicular magnetic recording medium having a double-layered Pt/Ti metal underlayer without a second nonmetallic (i.e., C) underlayer. As shown in FIG. 8, a perpendicular magnetic recording medium including a second nonmetallic (C) underlayer has higher perpendicular coercive force $Hc^{per}$ of a recording layer than that of the conventional perpendicular magnetic recording medium including no second nonmetallic (C) underlayers even if the third Pt underlayer of the former medium is thinner than that of the latter medium. The perpendicular magnetic recording media of FIG. 8 have similar perpendicular magnetic anisotropic energy constants Ku regardless of whether the second underlayer is used. As can be seen from FIG. 8, the total thickness of the two underlayers is either 10 nm or 20 nm in the particular example shown therein. Also, the thickness in these two underlayers is no more than 15 nm in certain embodiments.

Figure 9A:
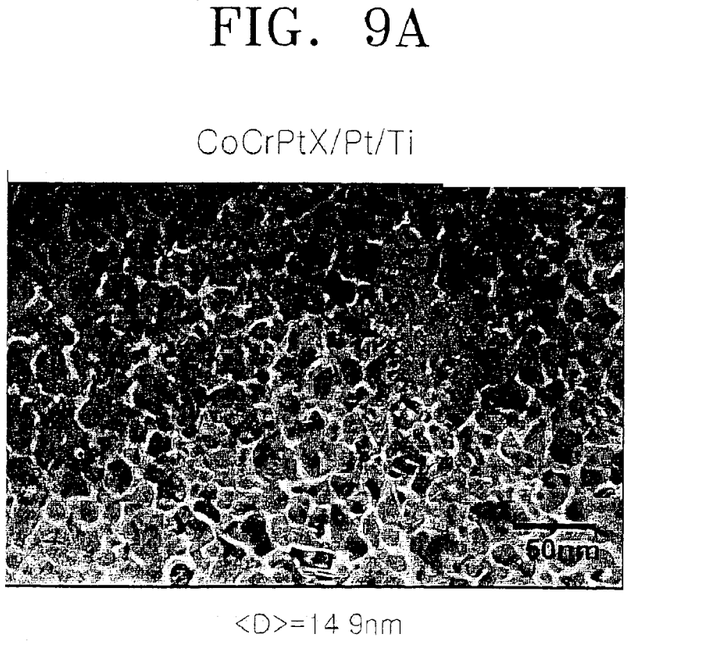
FIGS. 9A and 9B are graphs showing different crystal grain sizes for the perpendicular magnetic recording medium of FIG. 8, which are calculated from Scherrer Equation.
Figure 9B:
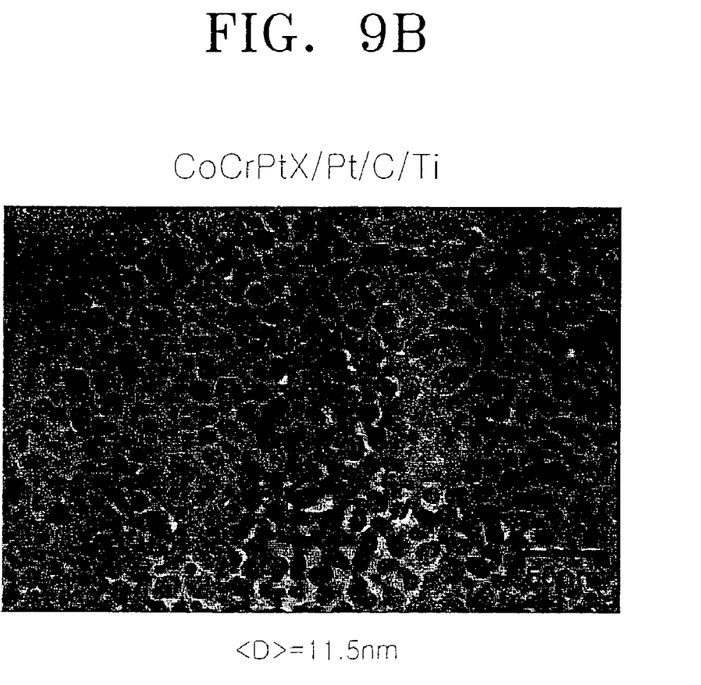

FIGS. 9A and 9B are transmission electron microscopy (TEM) images showing the differences in grain size and grain size distribution between a perpendicular magnetic recording media each grown on a conventional CoCrPtX/Pt/Ti bi-layered underlayer structure and a CoCrPtX/Pt/C/Ti tri-layered underlayer structure according to the present invention.

As shown in FIG. 9A, the average grain size of the conventional perpendicular magnetic recording medium is 14.9 nm. However, as shown FIG. 9B, in a perpendicular magnetic recording medium using the second nonmetallic (i.e., C) underlayer, the average grain size of the crystal grains of a recording layer is 11.5 nm. That is, according to the present invention, the size of the crystal grains of the recording layer is reduced from that of a conventional perpendicular magnetic recording medium not using the second C underlayer. Besides it can also be noted that the perpendicular magnetic recording medium using the second C underlayer shows uniform and narrower grain size distribution than a conventional perpendicular magnetic recording medium not using the second C underlayer.

Figure 10:
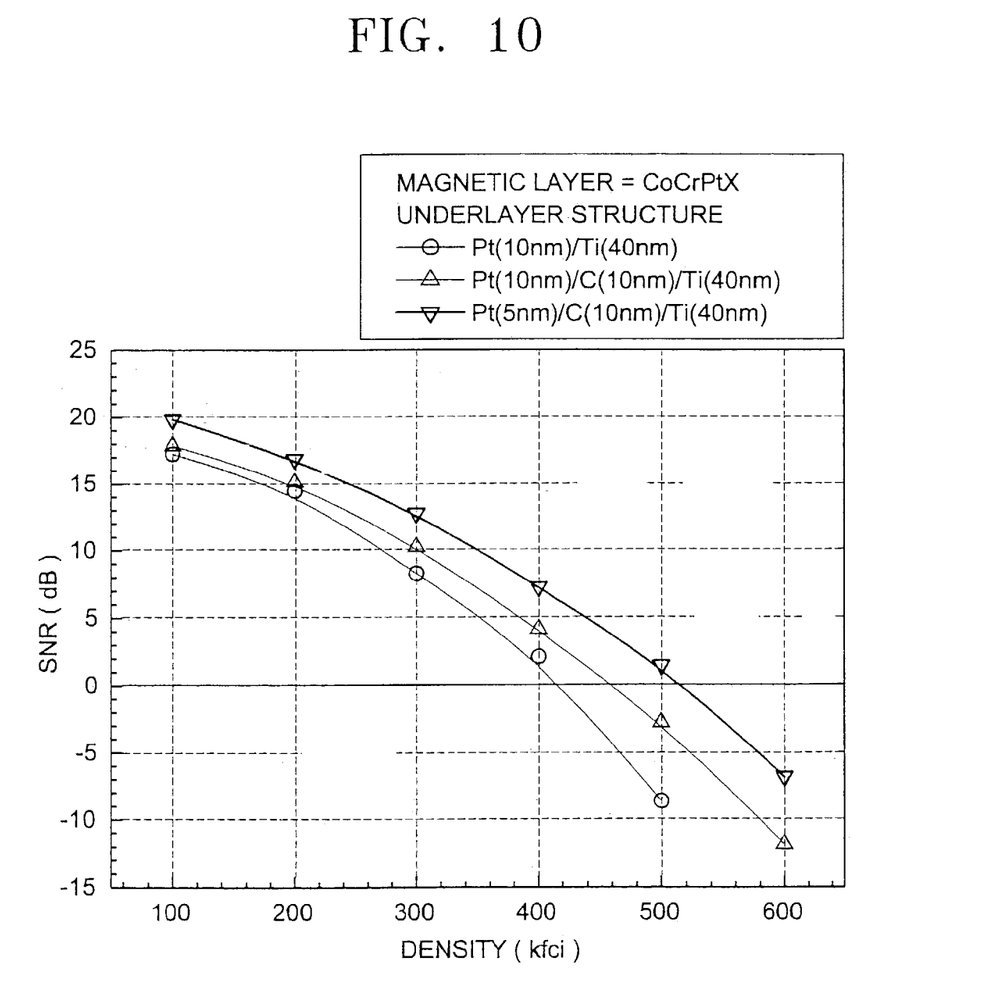
FIG. 10 is a graph showing variations in the spectral SNR of the perpendicular magnetic recording media of FIG. 8.

FIG. 10 shows variations in the spectral SNR of the perpendicular magnetic recording media of FIG. 8. As shown in FIG. 10, the SNR at a high recording density area is higher in the perpendicular magnetic recording media using the second C underlayer than in the convention perpendicular magnetic recording medium not using the second C underlayer.

The use of a double-layered or three-layered underlayer, which is a characteristic feature of the present invention, is not limited by a recording method. In other words, a double-layered or three-layered underlayer can be applied to both longitudinal and perpendicular magnetic recording methods.

In a perpendicular magnetic recording medium according to the present invention using a double-layered or three-layered underlayer, a high perpendicular magnetic anisotropic energy constant Ku is obtained due to a third underlayer, and a perpendicular magnetic recording layer with small crystal grains and a small exchange coupling can be formed due to a second underlayer below the third underlayer. Thus, the perpendicular magnetic recording layer can have a good thermal stability, high-density recording characteristics, and excellent SNR characteristics.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A magnetic recording medium comprising:
a magnetic recording layer; and
a substrate that supports the magnetic recording layer,
wherein at least three underlayers are placed between the magnetic recording layer and the substrate, and wherein a first underlayer of said at least three underlayers is formed over the substrate,
a second underlayer is formed in contact with the first underlayer, and
a third underlayer is formed on the second underlayer, wherein said first underlayer is formed of a material selected from the group consisting of Ti, Pt, Ta, Pd, and Au or an alloy containing at least two materials selected from the group, said second underlayer is formed of a nonmetallic material, and said third underlayer is formed of a material selected from the group consisting of Pt, Pd, Ru, a Pt alloy, a Pd alloy, and a Ru alloy.

2. The magnetic recording medium of claim 1, wherein the magnetic recording layer is a perpendicular magnetic recording layer.

3. The magnetic recording medium of claim 1, wherein a soft magnetic layer is formed between said at least three underlayers and the substrate.

4. The magnetic recording medium of claim 2, wherein a soft magnetic layer is formed between said at least three underlayers and the substrate.

5. The magnetic recording medium of claim 1, wherein the first underlayer is formed on the substrate, and the second underlayer is formed of a material selected from the group consisting of carbon, silicon, a silicon oxide, a silicon nitride, a metal oxide, a metal nitride, and a metal sulfide.

6. The magnetic recording medium of claim 2, wherein the first underlayer is formed on the substrate, and the second underlayer is formed of a material selected from the group consisting of carbon, silicon, a silicon oxide, a silicon nitride, a metal oxide, a metal nitride, and a metal sulfide.

7. The magnetic recording medium of claim 3, wherein the second underlayer is formed of a material selected from the group consisting of carbon, silicon, a silicon oxide, a silicon nitride, a metal oxide, a metal nitride, and a metal sulfide.

8. The magnetic recording medium of claim 4, wherein the second underlayer is formed of a material selected from the group consisting of carbon, silicon, a silicon oxide, a silicon nitride, a metal oxide, a metal nitride.

9. A magnetic recording medium comprising:
a magnetic recording layer; and
a substrate that supports the magnetic recording layer,
wherein two underlayers are included between the magnetic recording layer and the substrate, and wherein one underlayer is formed on a surface of a soft magnetic underlayer opposite from the surface of the underlayer on the substrate, wherein the one underlayer is formed of a material selected from the group consisting of silicon, a silicon oxide, a silicon nitride, and a metal sulfide, and the other underlayer is formed in contact with the magnetic recording layer of a material selected from the group consisting of Pt, Pd, Ru, a Pt alloy, a Pd alloy, and a Ru alloy.

10. A magnetic recording medium comprising:
a magnetic recording layer; and
a substrate that supports the magnetic recording layer,
wherein two underlayers are included between the magnetic recording layer and the substrate, wherein one underlayer is formed on the substrate, wherein the one underlayer is formed of a material selected from the group consisting of silicon, a silicon oxide, a silicon nitride, and a metal sulfide, and the other underlayer is formed of a material selected from the group consisting of Pt, Pd, Ru, a Pt alloy, a Pd alloy, and a Ru alloy.

11. A magnetic recording medium comprising:
a magnetic recording layer; and
a substrate that supports the magnetic recording layer,
wherein at least three underlayers are included between the magnetic recording layer and the substrate, wherein a first underlayer of said at least three underlayers is formed over the substrate, a second underlayer is formed on the first underlayer, and a third underlayer is formed on the second underlayer, wherein the first underlayer is formed of a material selected from the group consisting of Ti, Pt, Ta, Pd, and Au or an alloy containing at least two materials selected from the group, the second underlayer is formed of a material selected from the group consisting of carbon, silicon, a silicon oxide, a silicon nitride, a metal oxide, a metal nitride, and a metal sulfide, and the third underlayer is formed of a material selected from the group consisting of Pt, Pd, Ru, a Pt alloy, a Pd alloy, and a Ru alloy, and
wherein a soft magnetic layer is formed between the at least three underlayers and the substrate.

12. A magnetic recording medium comprising:
a magnetic recording layer; and
a substrate that supports the magnetic recording layer,
wherein the magnetic recording layer is a perpendicular magnetic recording layer,
wherein at least three underlayers are included between the magnetic recording layer and the substrate, wherein a first underlayer of said at least three underlayers is formed over the substrate, a second underlayer is formed on the first underlayer, and a third underlayer is formed on the second underlayer, wherein the first underlayer is formed of a material selected from the group consisting of Ti, Pt, Ta, Pd, and Au or an alloy containing at least two materials selected from the group, the second underlayer is formed of a material selected from the group consisting of carbon, silicon, a silicon oxide, a silicon nitride, a metal oxide, a metal nitride, and a metal sulfide, and the third underlayer is formed of a material selected from the group consisting of Pt, Pd, Ru, a Pt alloy, a Pd alloy, and a Ru alloy, and
wherein a soft magnetic layer is formed between the at least three underlayers and the substrate.

13. A magnetic recording medium comprising:
a magnetic recording layer;
a substrate that supports the magnetic recording layer; and
a soft magnetic layer placed between the magnetic recording layer and the substrate,
wherein at least three underlayers including at least a nonmetallic underlayer are placed between the magnetic recording layer and the soft magnetic layer, and
wherein the second underlayer is formed in contact with the third underlayer and the first underlayer and is formed of a material selected from the group consisting of silicon, a silicon oxide, a silicon nitride, and a metal sulfide, and
wherein the third underlayer of said at least three underlayers is in contact with the magnetic recording layer and is formed of a material selected from the group consisting of Pt, Pd, Ru, a Pt alloy, a Pd alloy, and a Ru alloy.

14. The magnetic recording medium of claim 13, wherein the magnetic recording layer is a perpendicular magnetic recording layer.

15. The magnetic recording medium of claim 13, wherein the first underlayer adjacent to the substrate is formed of a material selected from the group consisting of Ti, Pt, Ta, Pd, and Au or an alloy containing at least two materials selected from the group.

16. The magnetic recording medium of claim 14, wherein the first underlayer adjacent to the substrate is formed of a material selected from the group consisting of Ti, Pt, Ta, Pd, and Au or an alloy containing at least two materials selected from the group.

17. A magnetic recording medium comprising:
a magnetic recording layer;
a substrate that supports the magnetic recording layer; and
a soft magnetic layer placed between the magnetic recording layer and the substrate,
wherein two underlayers are included between the magnetic recording layer and the soft magnetic underlayer, and one underlayer in contact with the soft magnetic layer and the other underlayer, and the one underlayer is formed of a material selected from the group consisting of silicon, a silicon oxide, a silicon nitride, and a metal sulfide, and the other underlayer in contact with the magnetic recording layer is formed of a material selected from the group consisting of Pt, Pd, Ru, a Pt alloy, a Pd alloy, and a Ru alloy.

18. A magnetic recording medium comprising:
a magnetic recording layer;
a substrate that supports the magnetic recording layer; and
a soft magnetic layer placed between the magnetic recording layer and the substrate,
wherein the magnetic recording layer is a perpendicular magnetic recording layer, and
wherein two underlayers are included between the magnetic recording layer and the soft magnetic layer, and one underlayer in contact with the soft magnetic layer and the other underlayer, and the one underlayer is formed of a material selected from the group consisting of silicon, a silicon oxide, a silicon nitride, and a metal sulfide, and the other underlayer in contact with the magnetic recording layer is formed of a material selected from the group consisting of Pt, Pd, Ru, a Pt alloy, a Pd alloy, and a Ru alloy.

19. The magnetic recording medium of claim 9, wherein the total thickness of said two underlayers is 10 nm.

20. The magnetic recording medium of claim 1, wherein each of the at least three underlayers has an upper surface facing the magnetic recording layer and a lower surface facing the substrate, and wherein the first underlayer is formed on the upper surface of the substrate, the second underlayer is formed directly in contact with the upper surface of the first underlayer, and the third underlayer is formed directly in contact with the upper surface of the second underlayer.

* * * * *